United States Patent [19]

Coombs et al.

[11] 3,905,910

[45] Sept. 16, 1975

[54] METHOD FOR MAKING FILTER AIDS DISPERSIBLE IN HYDROCARBON LIQUIDS AND THE DISPERSIBLE PRODUCTS

[75] Inventors: Garth Coombs, Evergreen; Elbert Roy Butterworth, Littleton; George Richard Bell, Larkspur, all of Colo.

[73] Assignee: Johns-Manville Corporation, Denver, Colo.

[22] Filed: Mar. 11, 1974

[21] Appl. No.: 450,127

[52] U.S. Cl. ............... 252/259.5; 252/60; 252/428; 210/75; 210/506
[51] Int. Cl.............................................. C09k 3/00
[58] Field of Search ...... 210/75, 500, 506; 252/383, 252/60, 428, 259.5

[56] References Cited
UNITED STATES PATENTS

| | | | |
|---|---|---|---|
| 2,832,473 | 4/1958 | Oberholtzer | 210/75 |
| 3,252,898 | 5/1966 | Davis | 210/506 |
| 3,313,600 | 4/1967 | Laughlin | 210/75 |
| 3,368,678 | 2/1968 | Gilbert | 210/75 |
| 3,568,846 | 3/1971 | Haefner | 210/506 |
| 3,570,669 | 3/1971 | Davis | 210/75 |
| 3,648,847 | 3/1972 | Davis | 210/500 |

FOREIGN PATENTS OR APPLICATIONS

| | | | |
|---|---|---|---|
| 902,600 | 8/1962 | United Kingdom | 210/506 |

*Primary Examiner*—Samih N. Zaharna
*Assistant Examiner*—Ernest G. Therkorn
*Attorney, Agent, or Firm*—Robert M. Krone; John H. Miller

[57] ABSTRACT

Filter aids such as diatomite and perlite tend to flocculate when added to hydrocarbon liquids. This flocculation frustrates the formation of a satisfactory filter cake or precoat of the filter aid for filtration purposes. To overcome this problem a concentrate is made by intensively mixing a small amount of filter aid with more surfactant than is required to disperse the filter aid in a hydrocarbon liquid. This concentrate is then gently blended in one or more steps with additional filter aid to produce a final mixture having the desired amount of surfactant absorbed by the particles of the filter aid. This treated filter aid product will rapidly disperse in hydrocarbon liquids.

14 Claims, No Drawings

METHOD FOR MAKING FILTER AIDS DISPERSIBLE IN HYDROCARBON LIQUIDS AND THE DISPERSIBLE PRODUCTS

This invention relates to a method of pretreating a filter aid material, such as diatomite or perlite, with a dispersing agent or surfactant to improve the dispersing characteristics of the filter aid material in hydrocarbon liquids and to the products produced by this method.

BACKGROUND OF THE INVENTION

Filter aid materials are frequently added to liquid slurries to enhance filtration of the slurries by forming a permeable filter cake, with or without a precoat, on a more permeable filter surface. Filter aid materials enhance filtration because of their unique properties, usually attributed to the unusual shapes of the individual particles. When deposited as a filter cake from a aqueous slurry during the course of filtration the filter aid particles aid particles form a stable, highly permeable, and very retentive layer of uniform thickness. Retention of a filter aid pre-coat by the filter septum is also important to provide for initial clarification and to protect the surface of the filter septum from fouling.

Filter aid materials, such as diatomite and perlite, normally disperse well in aqueous slurries, but when the liquid medium in the slurry is a hydrocarbon the filter aid particles tend to coagulate or agglomerate and flocculate. When agglomeration occurs the uniquely shaped discrete particles no longer function individually, but rather as coarse aggregations having inferior filtration characteristics. These coarse aggregations have the added disadvantage of forming a porous, compressible filter cake which tends to collapse as filtration proceeds. This frustrates the filtering process.

The agglomeration of the filter aid particles also results in an uneven precoat and a reduction in the protection of the surface of the filter septum. This lack of protection greatly increases filter downtime for cleaning maintenance.

The agglomerates also tend to settle or precipitate out of the slurry in the pipes, the filter shell, and the precoat tank which is undesirable.

It has been proposed to add various dispersants or surfactants to the hydrocarbon filter aid system or slurry before attempting to form a precoat and filter cake on a filter surface to avoid the agglomeration problem. For example, U.S. Pat. Nos. 3,570,639 and 3,648,847 disclose adding a number of a family of oxazolines to a hydrocarbon slurry containing filter aid materials.

U.S. Pat. No. 3,368,678 discloses coating a filter aid, such as diatomite, with an aqueous solution of a cationic polymer, having a polymer concentration of 1–15 weight percent, followed by drying the filter aid to make the filter aid perform better in dry-cleaning solvents such as perchloroethylene. However, removing the water added to the diatomite with the cationic polymer is a costly and an undesirable feature of this technique. The reference also suggests that the cationic polymer solution can be added directly to the cleaning solvent.

It has now been discovered that the manner in which the dispersant is applied to the filter aid is extremely critical to the nature of the resultant filter aid particles, the dispersability of the resultant filter aid particles and to the control and cost of the application. Many dispersants suitable for use in dispersing filter aids, such as diatomite and perlite, in hydrocarbon liquids are in the form of viscous non-aqueous liquids. It has been found that if the dispersant is first added to the hydrocarbon liquid before adding the filter aid or if the filter aid is first added to the hydrocarbon liquid to form a slurry and the dispersant is then added to the slurry, some dispersion or deflocculation of the filter aid is obtained but the filter aid still is not deflocculated in the hydrocarbon nearly to the same degree as it normally is in water.

It has now been found that if the dispersant is mixed with the filter aid particles in a sufficient manner to obtain an intimate mixture prior to adding the filter aid to the hydrocarbon liquid, the filter aid will deflocculate in the hydrocarbon to essentially the same degree as it normally does in water. To obtain maximum deflocculation, it is not sufficient that the dispersant be intimately combined with only a portion of the filter aid. The dispersant must be intimately mixed with essentially all of the filter aid particles.

Only very small amounts of dispersants, based on the weight of the filter aid, are required for complete deflocculation in a hydrocarbon liquid, e.g. less than 0.5%. Also, filter aid materials are produced in tonnage quantities and the loose-fill bulk density of these filter aids is low, e.g. about 9 pcf for diatomite. Therefore, intimately mixing such a small quantity of a viscous liquid dispersant with such a relatively large volume of filter aid presents serious production problems. Although according to the prior art discussed above it might be possible to dilute the dispersant with a suitable solvent and spray the resultant solution onto the filter aid particles followed by removal of the solvent to leave only dispersant remaining on the particles, such a technique, even if operable, would be very costly in terms of equipment and energy needed to remove and recover the solvent. Further, spraying in such a manner as to obtain a uniform intimate mixture would be difficult at best.

When the viscous liquid dispersant is added directly to the filter aid particles, it tends to form lumps that can be broken down and intimately dispersed throughout the remainder of the filter aid particles only by using an intensive mixing action. Unfortunately, due to the fragility of the filter aid particles, such intensive mixing breaks down the particles to such an extent that their filter aid properties are undersirably deteriorated. Thus, it is not suitable to merely add the proper amount of viscous liquid dispersant to all of the diatomite and then intensively mix until an intimate mixture is obtained.

BRIEF SUMMARY OF THE INVENTION

It has now been discovered that if the proper amount of dispersant for a batch is first intensively mixed with only a small portion of the total filter aid required for the batch, a first concentrated mixture of a free-flowing, slightly damp, but essentially dry material is produced that can then be intimately mixed with the remainder of the filter aid in one or more steps using only a gentle mixing action that does not detrimentally break down the filter aid particles. Although the filter aid particles in the first mixture will usually be deteriorated from their original shape and size, they make up only a very small percentage of the total filter aid particles in the final mixture and therefore this deterioration is not critical to the filter aid properties of the final mixture.

DETAILED DESCRIPTION AND PREFERRED EMBODIMENTS

The same grade of filter aid can be and usually is used to make the free-flowing first concentrated mixture as is added later in making the final mixture, but it is sometimes preferred to use a different grade or grades of filter aid to make the first mixture. For example, one or more grades of less fragile and more shear-resistant filter aid might be used in making the first concentrated mixture to better resist deterioration due to the intensive mixing action. A more fragile and less shear-resistant grade of filter aid could be used to make up the remainder of the bath since it would not be deteriorated by the gentle mixing action required to intimately blend the first concentrated mixture with the remainder of the diatomite. Also, when the desired concentration of dispersant in the final mixture is extremely small, it may be desirable to use one or more grades of very fragile filter aid and/or to use smaller than normal filter aid particles in making the first concentrated mixture to achieve the greatest number of treated particles per pound of mixture. Such a first concentrated mixture could be more easily intimately blended with the remainder of the diatomite by gentle mixing action.

The concentration of the dispersant in the first concentrated mixture will be influenced by the desired dispersant concentration in the final mixture and will be limited to practical minimum and maximum levels. The practical minimum concentration will be limited to the amount of deteriorated filter aid particles that can be tolerated in the final mixture. For example, if the concentration of dispersant in the first concentrated mixture is much below 10 times the desired concentration in the final mixture the amount of deteriorated particles of filter aid in the final composition becomes significantly detrimental to the filter aid properties of the final mixture.

The practical maximum concentration of the dispersant in the first concentrated mixture is limited by the nature of the mixture. If the concentration is too high the mixture loses its free-flowing characteristics and becomes a wet, lumpy or lump-forming mixture that will not become intimately mixed by gentle blending with the remainder of the filter aid. This practical maximum level will vary somewhat depending upon the type of filter aid and the particular dispersant used, but in any case must be such that the first concentrated mixture is a free-flowing powder. With viscous liquid dispersants the maximum practical concentration level has been found to be below about 60% dispersant, based on the total weight of the first mixture, but it is preferred to maintain the dispersant concentration in the first concentrated mixture between about 20 and about 40% and most preferably between about 25 and 35%, based on the total weight of the first mixture. The preferred range would normally be about 65 to about 130 times and the most preferred range about 80 to about 120 times the desired concentration in the final mixture.

Any type of mixer that provides intensive mixing action without producing excessive shearing action can be used to produce the free-flowing first concentrated mixture. It is preferred to use a Littleford-Lodige mixer having conventional high-speed choppers, available from Littleford Bros., Inc. A twin-shell (Vee) blender equipped with conventional agglomerate breaking devices can also be used.

In making the first concentrated mixture many conventional dispersants or surfactants can be used. The primary requirement of the surfactant is to disperse rapidly the treated filter aid particles in at least one hydrocarbon liquid and preferably in a wide variety of hydrocarbon liquids. Some surfactants that have been found useful in the practice of the present invention include GAFAC RS 610, manufactured by the GAF Corporation, ARQUAD 2HT75 available from Armour and Company, CENTROLEX I and ACTIFLOW 68UB available from Central Soya Company, Inc., Deltazolines A-8 through A-22 manufactured by the Reichhold Chemical Company and ZELEC NE manufactured by the DuPont Company. The optium concentration of these surfactants in the final mixture is usually below 0.5% and in many cases is about 0.2–0.3 weight percent.

After the first concentrated mixture is obtained it is then gently mixed with sufficient filter aid material to produce an intimately blended final mixture having the desired concentration of surfactant. This can be accomplished by one or more gentle blending steps. For example, the surfactant concentration of the first concentrated mixture can be reduced in one step to the final desired concentration by adding all of the remaining filter aid and then gently blending to form an intimate mixture. It has been found advantageous to convert the first concantrated mixture to an intimately mixed second concentrated mixture whose surfactant concentration is lower than that of the first concentrated mixture, but higher than the final desired concentration and then to convert this second concentrated mixture to an intimate mixture having the final desired surfactant concentration. This latter technique can more readily produce a more intimate mixture. Of course, more than two gentle blending steps could be utilized but the increased cost would tend to offset any advantages that might otherwise result from these additional gentle blending steps.

Many types of blending mixers can be used so long as their action on the material being mixed is gentle. The preferred type of mixer for the gentle blending step or steps is a ribbon-type mixer, but tumbling-type mixers, double-bladed mixers and mixing-type screw conveyors would also be suitable.

The final mixture having the desired concentration of surfactant absorbed by the surfaces of the filter aid particles has the same appearance and flow characteristics as untreated filter aid and therefore can be handled, packaged, shipped, stored and used in the same manner as conventional filter aid material. This is particularly advantageous to the user who, with the product of the present invention, is not burdened with the problems inherent in storing and metering a correct amount of a surfactant into a hydrocarbon liquid either prior to or after addition of an untreated filter aid as suggested by the prior art.

The following examples illustrate the advantages of the present invention over various techniques of adding a surfactant or dispersing agent including those suggested by the prior art.

EXAMPLE 1

One hundred milliliters of water were placed in a first

100ml graduate and 100 milliliters of toluene, a conventional hydrocarbon liquid, were placed in a second 100ml graduate. Five grams of HYFLO SUPER-CEL diatomite filter aid available from Johns-Manville Corporation, were added to each graduate and the two graduates were shaken under the same conditions to disperse the diatomite in the two liquids. The diatomite dispersed rapidly and thoroughly in the graduate containing water, but appeared to form flocs in the graduate containing toluene. After standing overnight, the diatomite had settled in the bottom of the graduate containing water to a volume of about 13–15ml. while in the graduate containing toluene the diatomite had only settled to a volume of about 35–37ml. The flocs or clumps of diatomite particles formed in the toluene has prevented the diatomite from settling to an extent necessary to form a satisfactory precoat or cake for a filter.

EXAMPLE 2

One hundred milliliters of toluene were added to a 100ml graduate and thereafter 0.3%, based on the weight of the diatomite to be added, of GAFAC RS610 surfactant was added to the toluene and thoroughly mixed. Five grams of diatomite were then added to the toluene surfactant mixture and shaken in the same manner used in Example 1. After setting overnight the diatomite had only settled to a volume of 18–20ml. Although this is an improvement over the use of diatomite in straight toluene, the diatomite still did not disperse as well or settle to the same degree as it did in water.

EXAMPLE 3

One hundred milliliters of toluene were added to a 100ml graduate and thereafter 5 grams of diatomite were added and the graduate and its contents were shaken as in Examples 1 and 2. Next, 0.015 grams of GAFAC RS610, which is 0.3% of the diatomite added, were added to the toluene-diatomite slurry and the graduate and its contents were again shaken as before. After standing overnight, the diatomite had only settled to a volume of 30–32ml. This manner of adding the surfactant was essentially ineffective.

EXAMPLE 4

A concentrate was made by intensively mixing 0.015 grams of GAFAC RS610 with 0.5 grams of diatomite. One hundred milliliters of toluene were added to a 100ml graduate. The concentrate and 4.5 grams of untreated diatomite, were separately added to the toluene and the graduate and its contents were shaken as before. After standing overnight, the diatomite had only settled to a volume of 18–20ml. Although this represents an improvement, the diatomite was still not dispersed as well nor did it settle to the same degree as it did in water.

EXAMPLE 5

A 3% concentrate was made by intensively mixing 0.015 grams of GAFAC RS610 with 0.5 grams of diatomite. This concentrate was then gently blended with the remaining 4.5 grams of diatomite to form 5.015 grams of a final mixture containing very close to 0.3% of the surfactant, based on the weight of the diatomite present. This 5.015 grams of mixture was added to 100ml of toluene in a 100ml graduate and shaken as in the previous examples. After standing overnight the diatomite had settled to a volume of only 13–15ml indicating a degree of dispersion and settling equal to that displayed by diatomite in water.

In all of the previous examples, the type of diatomite described in Example 1 was used. In these examples only one type of surfactant was used in order to change only one variable from test to test. The other surfactants mentioned earlier in the specification display the same general type of results as GAFAC RS610 although the magnitudes of change from test to test vary somewhat. Table I is provided for convenience in comparing the results of Examples 1–5.

TABLE I

|  | Example No. | | | | | |
|---|---|---|---|---|---|---|
|  | 1 water | 1 toluene | 2 | 3 | 4 | 5 |
| Condition of filter aid immediately after shaking: | well dispersed | severe flocculation | some flocculation | severe flocculation | some flocculation | well dispersed |
| Height of filter aid in 100ml graduate after standing overnight (ml): | 13–15 | 35–37 | 18–20 | 30–32 | 18–20 | 13–15 |

The previous examples illustrate the effectiveness of the technique and the resultant product of the present invention on laboratory scale batches. The following example verifies the advantages of the present invention on a production sized batch.

EXAMPLE 6

Twenty-five pounds of CELITE 503 diatomite filter aid available from Johns-Manville Corporation, were placed in a conventional Littleford-Lodige mixer having a plow speed set for about 110 rpm and a chopper speed of about 3600rpm. The plows and choppers were started and immediately about 10.7 pounds of GAFAC RS610 surfactant were gradually fed into the mixer at such a rate that all of the surfactant was added to the mixer about 90 seconds from the time the plows and chopper were started. After all of the surfactant was added the mixer was allowed to continue running another 15 seconds. The dump door in the mixer was then opened and the choppers and plows were allowed to operate for 30 seconds to discharge the free-flowing first concentrated mixture having a surfactant concentration of about 30%, based on the total weight of the mixture. The previously described process is repeated one or more times to produce a desired supply of first concentrated mixture. Four hundred and fifty pounds of diatomite were added to a clean ribbon mixer. The ribbon mixer was started and 50 pounds of the 30% concentrate mixture were added and mixed for ten minutes to produce a second concentrated mixture containing about 3% surfactant. Four hundred and fifty pounds of diatomite were added to a clean ribbon mixer. The mixer was started, 50 pounds of the second concentrated mixture was added, and allowed to mix for 10 minutes after which the mixer was dumped. The resultant final mixture, having a surfactant concentration of about 0.3%, was packaged in a conventional manner.

Ten samples each representing successive 50-lb. bags of the resultant product were then tested for dispersion as previously described. Five-gram portions of each were dispersed in 100ml of toluene. All produced settled volumes within plus or minus 1.5ml of the 15ml settled volume of the same weight of untreated filter aid dispersed in water thus showing a high degree of uniformity throughout the finished product.

EXAMPLE 7

Five-gram samples of the final mixture produced by Example 6 were added to 100ml of seven different hydrocarbon liquids, each in 100ml graduates, and shaken and allowed to set overnight in the same manner used in Examples 1–5. The results of these tests are reported in Table II and show the effectiveness of the method and product of the present invention.

TABLE II

| Hydrocarbon Liquid: | Height of filter aid in 100ml graduate after standing overnight (ml): |
|---|---|
| Toluene | 12 |
| Naptha | 15.5 |
| Perchloroethylene | 11 |
| Pentane | 12 |
| Hexane | 20 |
| Stoddard Solvent | 17 |

Although, in Example 6 separate ribbon blenders were used for each of the gentle blending steps, a single blender could have been used if properly sized. The mixing times will vary somewhat depending on batch size, but over-mixing should be avoided as excessive mixing will degrade the filter aid structure and decrease the flow rate of the precoat.

The present invention is applicable to a wide range of relatively fragile filter aid materials such as the various filter aid grades of diatomite and perlite.

What we claim is:

1. A method of making a dispersable filter aid material having a desired surfactant concentration, having essentially the same flow characteristics as untreated filter aid material and that rapidly disperses in hydrocarbon liquids, consisting essentially of:
   a. intensively mixing a desired amount of filter aid with an amount of a surfactant to form a free-flowing first concentrated mixture, the surfactant concentration in said first mixture being at least ten times as great as the surfactant concentration in the dispersable filter aid material;
   b. adding, in at least one step, sufficient filter aid to a desired amount of the first concentrated mixture to produce the desired surfactant concentration in the dispersable filter aid material and gently blending the filter aid and the desired amount of first concentrated mixture after the addition of filter aid until an intimate mixture of surfactant and filter aid is obtained to produce the dispersable filter aid material.

2. The method according to claim 1 wherein the surfactant concentration in said first mixture is at least 25 times as great as the surfactant concentration in the dispersable filter aid material.

3. The method according to claim 2 wherein the surfactant concentration in said free-flowing first concentrated mixture is between about 65 and about 130 times as great as the surfactant concentration in the dispersable filter aid material.

4. The method according to claim 3 wherein an amount of filter aid and a desired amount of the first concentrated mixture are gently blended to form a second concentrated mixture having a surfactant concentration lower than the surfactant concentration in said first concentrated mixture but higher than the surfactant concentration desired in the dispersable filter aid material and then a sufficient amount of filter aid and a desired amount of said second concentrated mixture are gently blended to form said dispersable filter aid material.

5. The method according to claim 3 wherein said filter aid material is diatomite.

6. The method according to claim 4 wherein said filter aid material is diatomite.

7. The method of claim 3 wherein said filter aid material is perlite.

8. The method of claim 4 wherein said filter aid material is perlite.

9. The method of claim 4 wherein the filter aid used to produce the first concentrated mixture is of a different grade than the filter aid used to produce said second concentrated mixture and the filter aid added to said second concentrated mixture.

10. The method according to claim 9 wherein the filter aid used to produce said first concentrated mixture is less fragile and more shear-resistant than the filter aid used to produce said second concentrated mixture.

11. The method according to claim 9 wherein the filter aid used to produce said first concentrated mixture is more fragile and less shear-resistant than the filter aid used to produce said second concentrated mixture.

12. The process of claim 4 wherein the surfactant concentration in said first mixture is about 80 to 120 times as great as the surfactant concentration in the dispersable filter aid material.

13. A dispersable filter aid material produced by the process of claim 1.

14. A dispersable filter aid material produced by the process of claim 1 that rapidly disperses in relatively non-polar organic liquids, said liquids having a dielectric constant of less than about 30.

* * * * *

UNITED STATES PATENT AND TRADEMARK OFFICE
CERTIFICATE OF CORRECTION

PATENT NO. : 3,905,910
DATED : September 16, 1975
INVENTOR(S) : Garth Coombs, et al It is certified that error appears in the above-identified patent and that said Letters Patent are hereby corrected as shown below:

Column 1, line 40, "and" has been left out, should follow after --cleaning and maintenance--

Column 1, line 48, "3,570,639" should read --3,570,669--

Column 3, line 16, "bath" should read --batch--

Column 4, line 17, "optium" should read --optimum--

Column 4, line 31, "concantrated" should read --concentrated--

Column 5, line 16, "has" should read --had--

Signed and Sealed this twenty-third Day of December 1975

[SEAL]

Attest:

RUTH C. MASON
Attesting Officer

C. MARSHALL DANN
Commissioner of Patents and Trademarks